US011461241B2

(12) United States Patent
Carpenter et al.

(10) Patent No.: US 11,461,241 B2
(45) Date of Patent: Oct. 4, 2022

(54) STORAGE TIER MANAGEMENT FOR FILE SYSTEMS

(71) Applicant: Qumulo, Inc., Seattle, WA (US)

(72) Inventors: Edward Carpenter, Seattle, WA (US); Ying Fairweather, Sammamish, WA (US); Tripurari Volpe, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/190,653

(22) Filed: Mar. 3, 2021

(65) Prior Publication Data
US 2022/0283956 A1 Sep. 8, 2022

(51) Int. Cl.
G06F 12/122 (2016.01)
G06F 16/172 (2019.01)
G06F 12/0875 (2016.01)

(52) U.S. Cl.
CPC ........ *G06F 12/122* (2013.01); *G06F 12/0875* (2013.01); *G06F 16/172* (2019.01); *G06F 2212/1044* (2013.01)

(58) Field of Classification Search
None
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Examination Report for European Patent Application No. 17206518.7 dated Feb. 23, 2021, pp. 1-6.

(Continued)

*Primary Examiner* — William E. Baughman
(74) *Attorney, Agent, or Firm* — John W. Branch; Branch Partners PLLC

(57) ABSTRACT

Embodiments are directed to managing data in a file system. A file system that includes a file storage tier and a cache storage tier may be provided. An amount of hot blocks present in the cache storage tier that are associated with a heat score that matches a maximum heat score value may be determined. In response to the amount of hot blocks exceeding an amount threshold value further actions may be performed, including: determining each cooldown block in the cache storage tier based on each heat score associated with each block in the cache storage tier; and decrementing the heat score associated with each cooldown block. In response to one or more blocks in the cache storage tier being read, the heat score associated with the one or more blocks being read may be set to the maximum heat score value.

20 Claims, 11 Drawing Sheets

(56) References Cited

U.S. PATENT DOCUMENTS

| | | |
|---|---|---|
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 * | 6/2013 | Harty ............ G06F 3/0685 707/813 |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 * | 1/2020 | Carpenter ............ G06F 3/0685 |
| 10,540,662 B2 | 1/2020 | Barlett et al. |
| 10,545,986 B2 | 1/2020 | Tappan et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 * | 4/2006 | Zohar ............... G06F 12/0866 711/133 |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | T. Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |

(56) References Cited

U.S. PATENT DOCUMENTS

| | | |
|---|---|---|
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1* | 1/2013 | Gorobets .............. G06F 3/0611 711/103 |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1* | 8/2014 | Shivashankaraiah ........................ G06F 12/123 711/136 |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0110105 A1 | 4/2016 | Karamcheti et al. |
| 2016/0139836 A1 | 5/2016 | Nallathambi et al. |
| 2016/0147654 A1* | 5/2016 | Zhao .................... G06F 12/084 711/130 |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1* | 9/2016 | Usgaonkar .......... H04L 67/2842 |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1* | 2/2017 | Ash .................... G06F 12/0893 |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1* | 11/2017 | Roh .................... G06F 12/128 |
| 2017/0344598 A1 | 11/2017 | Constantinescii et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1* | 7/2018 | Hughes .............. G06F 12/0888 |
| 2018/0276078 A1 | 9/2018 | Blea et al. |
| 2018/0288057 A1 | 10/2018 | Varadamma et al. |
| 2018/0314423 A1 | 11/2018 | Gong et al. |
| 2018/0365115 A1 | 12/2018 | Fang et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0286521 A1 | 9/2019 | Okpotse et al. |
| 2019/0286528 A1 | 9/2019 | Wu et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0142878 A1 | 5/2020 | Varadarajan et al. |
| 2020/0174692 A1 | 6/2020 | Dave et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |

(56) References Cited

U.S. PATENT DOCUMENTS

| | | | |
|---|---|---|---|
| 2021/0110150 A1 | 4/2021 | Kakrana et al. |
| 2021/0191650 A1 | 6/2021 | Vansteenkiste et al. |
| 2021/0240393 A1 | 8/2021 | Jo et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0091739 A1 | 3/2022 | Kumar et al. |

FOREIGN PATENT DOCUMENTS

| | | | |
|---|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 16/226,587 dated Aug. 5, 2019, pp. 1-46.
Office Communication for U.S. Appl. No. 16/231,354 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Muititenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.

(56) References Cited

OTHER PUBLICATIONS

Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 23, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-5.
Office Communication for U.S. Appl. No. 14/659,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_ science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 23, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970.
Office Communication for U.S. Appl. No. 16/262,756 dated Aug. 24, 2020, pp. 1-7.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30. 2020. pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.

(56) References Cited

OTHER PUBLICATIONS

Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.

\* cited by examiner

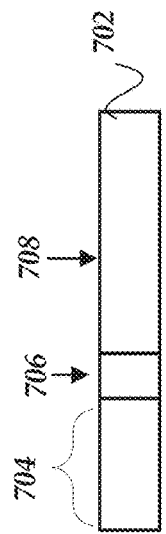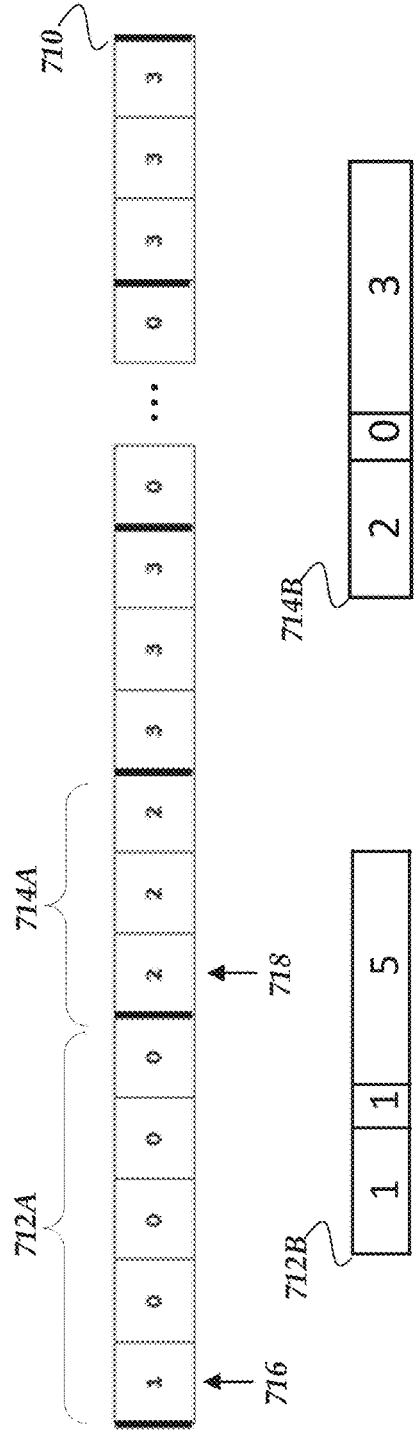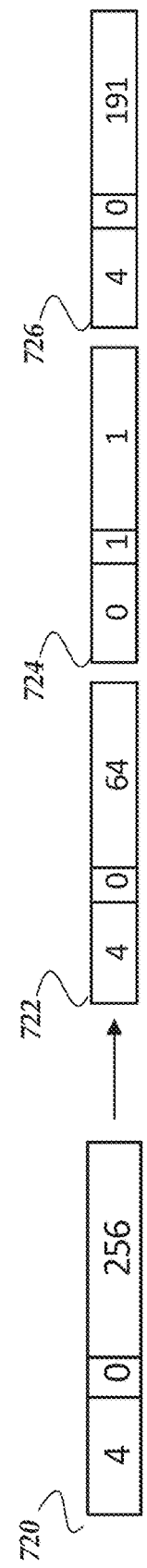
Fig. 7A
Fig. 7B
Fig. 7C

STORAGE TIER MANAGEMENT FOR FILE SYSTEMS

TECHNICAL FIELD

The present invention relates generally to file systems, and more particularly, but not exclusively, to file system cache management in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Conventionally, some distributed file systems implement various caching schemes to help improve performance. However, as file systems increase in size or complexity, caching or cache management may increasingly become burdensome in terms of performance or storage requirements. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 7A illustrates a logical schematic of a heat extent that is in accordance with one or more of the various embodiments;

FIG. 7B illustrates a logical schematic of a block set in accordance with one or more of the various embodiments;

FIG. 7C illustrates a logical representation for splitting or combining heat extents in accordance with one or more of the various embodiments;

DETAILED DESCRIPTION OF VARIOUS EMBODIMENTS

Figure 1:
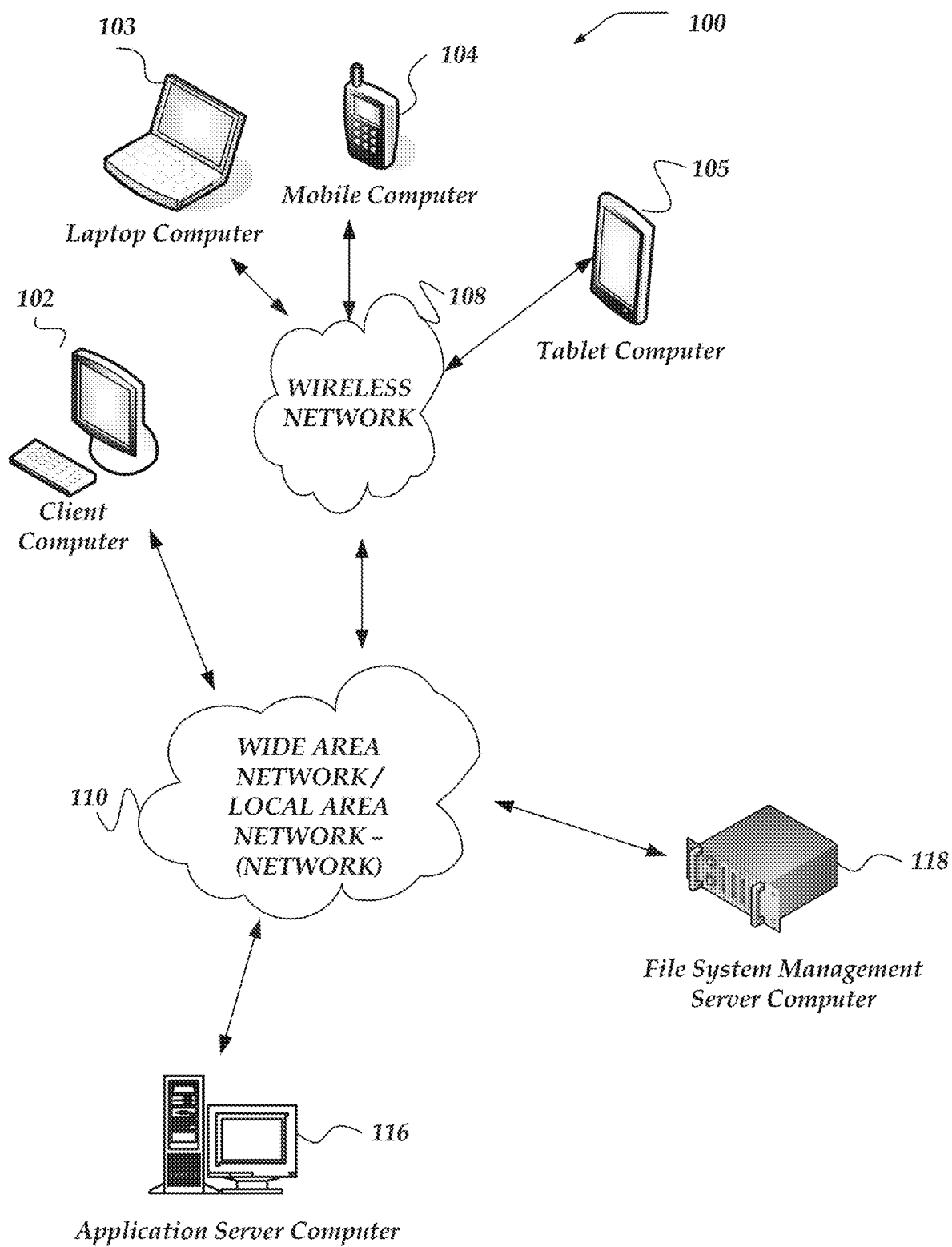
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object.

As used herein the term "heat score" refers to a value that represents the amount of activity directed to a block or file system object. Generally, storing blocks associated with higher heat scores in higher performing cache tier is likely to improve performance or responsiveness of a file system. Low heat scores indicate that block are not accessed as often as blocks associated with higher heat scores. Note, heat scores are one factor of many that may be considered to determine if a block should be promoted or demoted from a storage tier or cache tier.

As used herein the term "heat extent" refers to a data structure that is used to store the heat state associated with one or more blocks. Heat extents may comprise various properties or attributes, include, a heat score, location indicator, dirty indicator, run length value, or the like. Heat extents may be used to represent heat state for one or more blocks in a file system.

As used herein the terms "heat extent group," "heat group," or "group" refer to a data structure that includes one or more heat extents that are grouped together, heat extents in a group are ordered to represent the positional order of the blocks they represent.

As used herein the term "heat extent group summary," "heat summary" refer to data structures that include various aggregate metrics or statistics associated with a heat extent group. Heat extent group summaries provide light weight data sketches that enable rapid or efficient evaluation of the characteristics of the heat extent that comprise of heat extent group.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system that includes a file storage tier and a cache storage tier may be provided such that the file system stores a plurality of blocks in the file storage tier and a portion of the plurality of blocks in the cache storage tier, and such that each block in the cache storage tier is associated with a heat score.

In one or more of the various embodiments, an amount of two or more hot blocks present in the cache storage tier that are associated with a heat score that matches a maximum heat score value may be determined.

In one or more of the various embodiments, in response to the amount of hot blocks exceeding an amount threshold value further actions may be performed, including: determining each cooldown block in the cache storage tier based on each heat score associated with each block in the cache storage tier such that each cooldown block is a block associated with a heat score that exceeds a minimum heat score value; and decrementing the heat score associated with each cooldown block.

In one or more of the various embodiments, in response to one or more blocks in the cache storage tier being read, the heat score associated with the one or more blocks being read may be set to the maximum heat score value.

In one or more of the various embodiments, in response to a request for the one or more blocks to be evicted from the cache storage tier, the one or more blocks may be evicted based on the request and the heat score associated with each of the one or more blocks such that each evicted block is associated with an evicted heat score that is less-than or equal to the non-evicted heat score of each block of the portion of the plurality of blocks that remain in the cache storage tier.

In one or more of the various embodiments, one or more other blocks that are eligible for storing in the cache storage tier may be determined based on one or more cache policies and file system activity that is associated with the one or more other blocks. And, in some embodiments, the one or more other blocks may be stored in the cache storage tier such that each heat score associated with the one or more other blocks may be set to the maximum heat score value.

In one or more of the various embodiments, in response to writing to the one or more blocks in the cache storage tier, the heat score associated with the one or more blocks may be set to the maximum heat score value.

In one or more of the various embodiments, in response to the file system restarting after being shutdown while the portion of the plurality of blocks is in the cache storage tier, performing further actions, including: determining each block in the cache storage tier based on the file system and the cache storage; and setting the heat score for each block in the cache storage tier to an initial heat score value.

In one or more of the various embodiments, one or more heat extents that include a heat score and a run-length may be provided. And, in some embodiments, one or more blocks of the portion of the plurality of blocks in the cache storage tier may be associated with each heat extent based on a location of each block in the cache storage tier and the heat score of each block such that each block associated with each heat extent is contiguous to each other in the cache storage tier and each block associated with each heat extent has the same heat score and such that the run-length associated with each heat extent is set to a number of the one or more blocks associated with it.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2.

In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
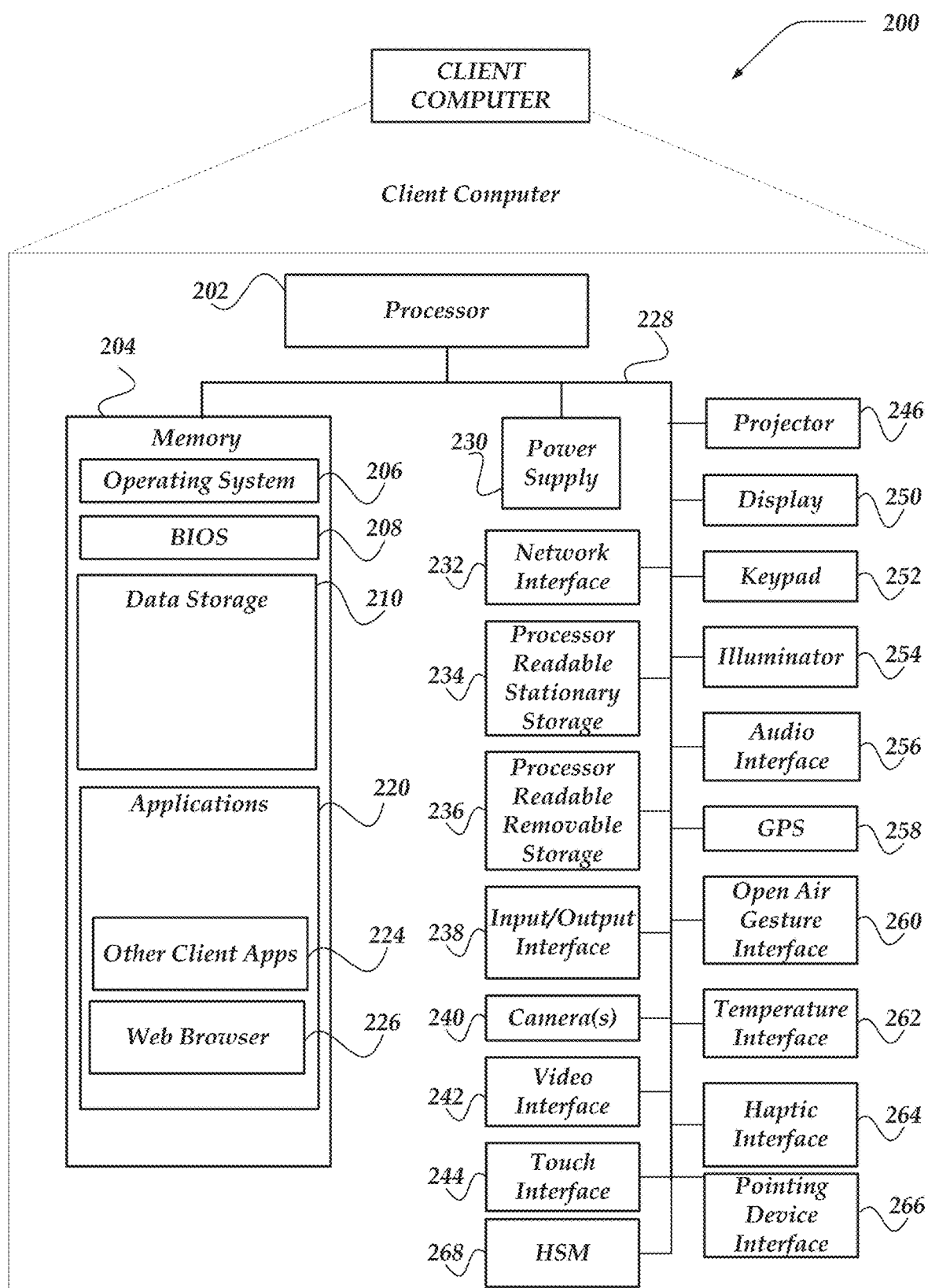
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
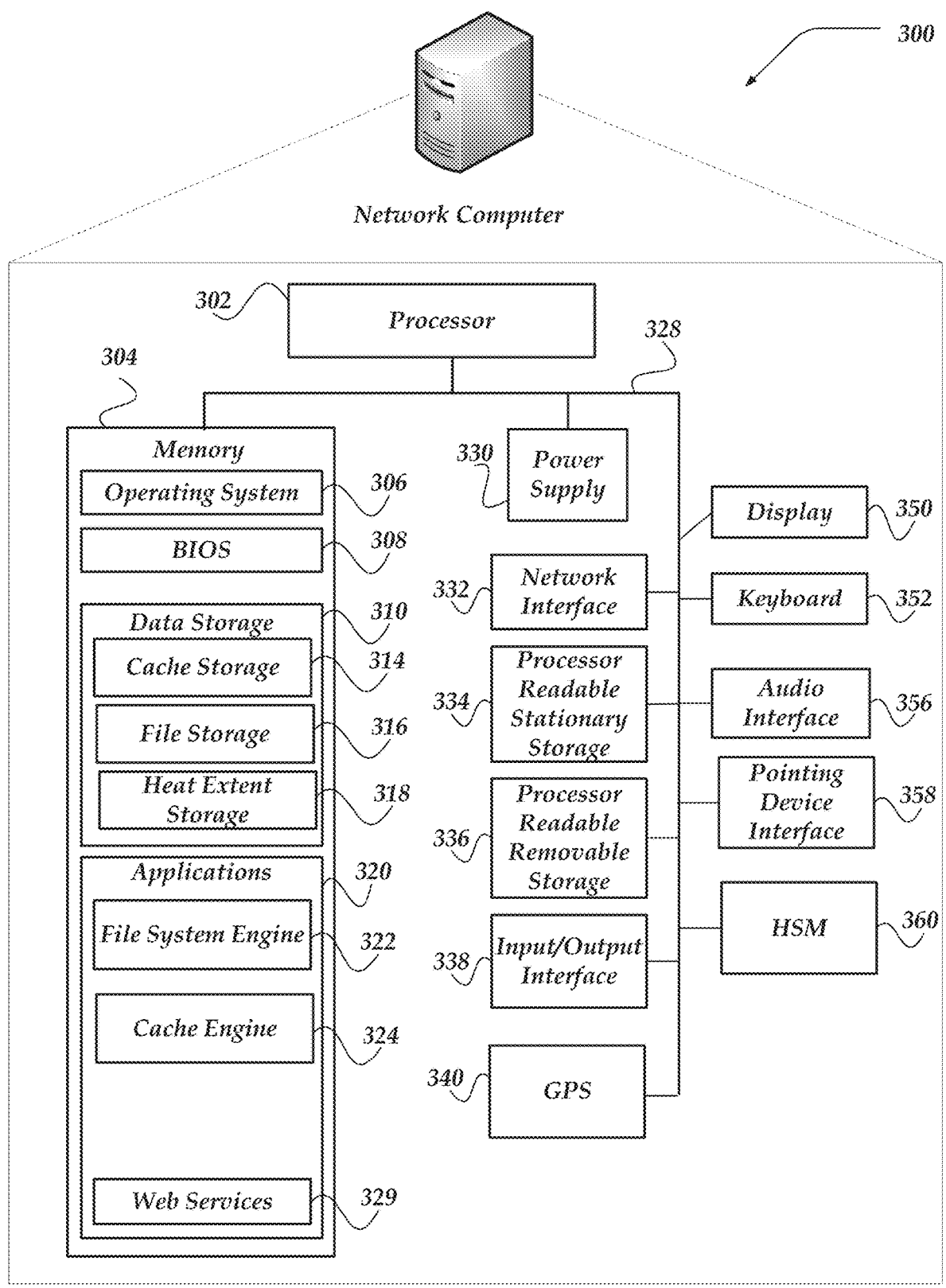
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, cache engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, cache storage 314, file storage 316, heat extent storage 318, or the like. Cache storage 314 or file storage 316 may store files, documents, versions, properties, permissions information, file meta-data, data structures, or the like, that represent one or more portions of a distributed file system. In some embodiments, various storable objects (e.g., file system objects) may be divided into one or more blocks or pages that are stored or indexed in cache storage 314 or file storage 316. In some embodiments, cache storage 314 may comprise one or more solid state drives (SSDs) and file storage 316 may comprise one or more hard drives (HDDs).

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, cache engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, cache engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, cache engine 324, web services 329, or the like, may be provisioned and de-commissioned automatically.

Also, in one or more of the various embodiments, file system engine 322, cache engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
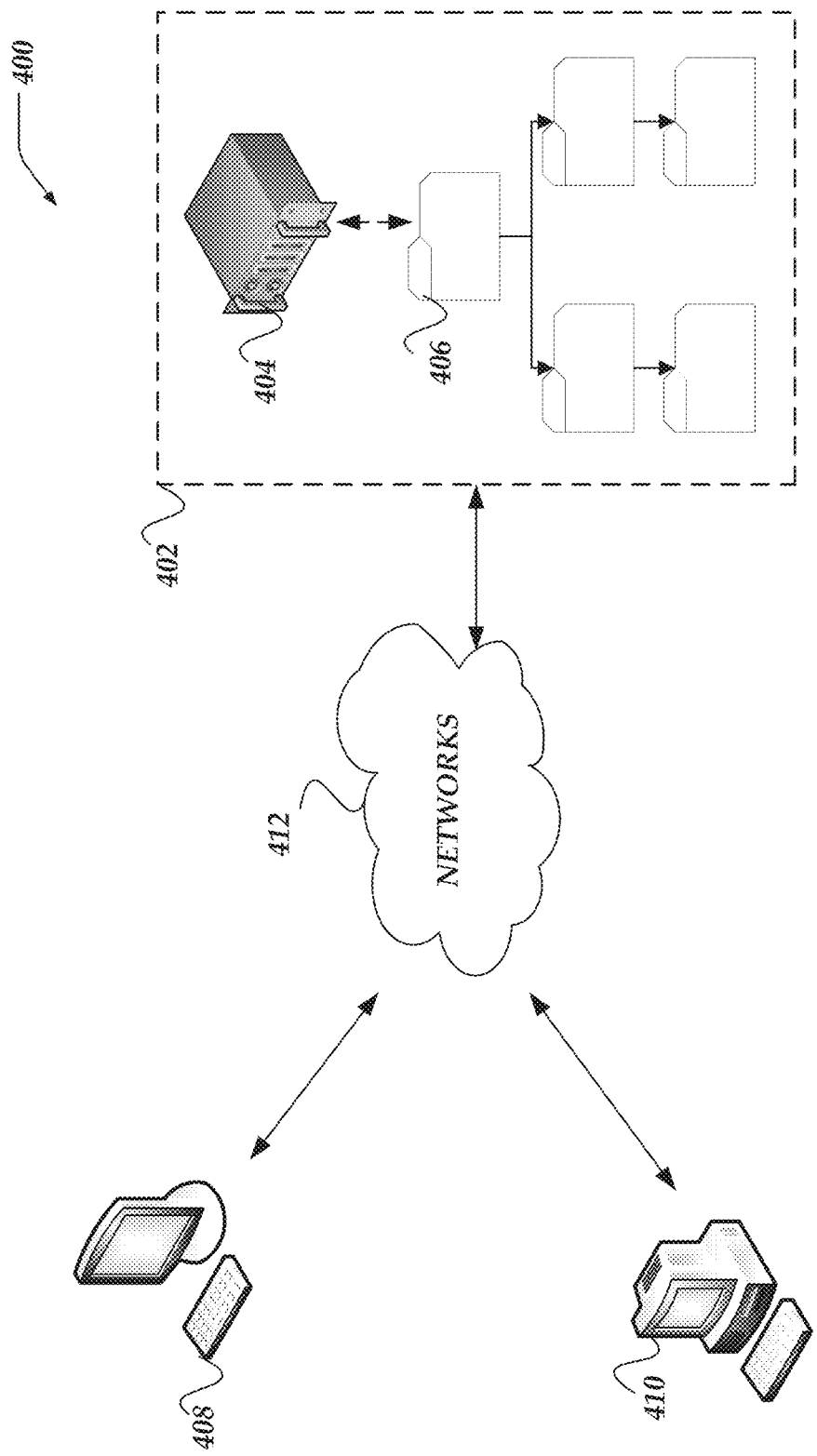
FIG. 4 illustrates a logical architecture of a system for storage tier management for file systems in accordance with one or more of the various embodiments.

FIG. 4 illustrates a logical architecture of system 400 for storage tier management for file systems in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, blocks, pages, or the like. In some embodiments, primitive file system objects, such as, blocks or pages, may be used to compose more complex file system objects.

In one or more of the various embodiments, the implementation details that enable file system 402 to operate may be hidden from clients such that they may be arranged to use file system 402 the same way they use other file systems, including local file systems. Accordingly, in one or more of the various embodiments, clients may be unaware that they are using a file system that supports one or more cache tiers because file system engines or cache engines may be arranged to mimic the interface or behavior of native file systems used by the clients.

Also, while file system 402 is illustrated as using one file system management computer with one set of file system objects, the innovations described herein are not so limited. Innovations herein contemplate file systems that include one or more file system management computers or one or more file system object data stores. In some embodiments, file system object stores (e.g., file storage 316) may be located remotely from one or more file system management computers. Also, a logical file system object store or file system may be spread across two or more cloud computing environments, storage clusters, one or more on-premises servers, or the like, or combination thereof.

Figure 5:
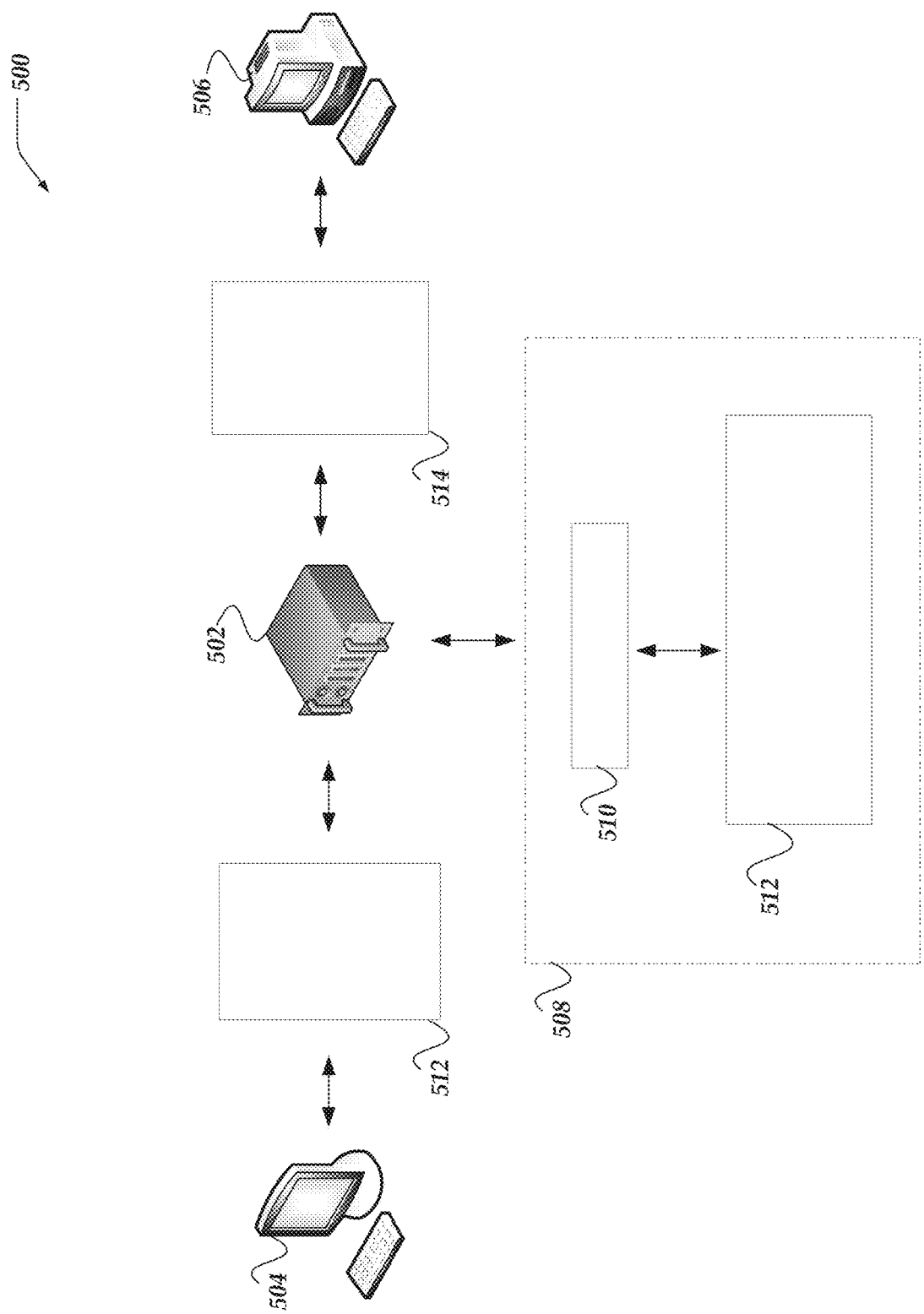
FIG. 5 illustrates a logical architecture of a file system that includes cache tiers in accordance with one or more of the various embodiments.

FIG. 5 illustrates a logical architecture of file system 500 that includes cache tiers in accordance with one or more of the various embodiments. As described above, file systems may include one or more file system management server computers, such as, file system management server computer 502. Also, in one or more of the various embodiments, one or more client computers, such as, client computer 504 and client computer 506 may access (e.g., read, write, or delete) one or more file system objects, such as, file system object 512 or file system object 514.

In one or more of the various embodiments, file system management server computers may be arranged to store or manage the storage of file system objects. In some embodiments, data storage 508 may represent one or more data storage systems or devices that may be used to store file system objects. In some embodiments, data storage 508 may include one or more cache storage tiers, such as, cache storage tier 510. Also, in some embodiments, data storage 508 may include one or more file storage tiers, such as file storage tier 512. In some embodiments, cache storage tier 510 may be comprised of storage components or resources that for one or more reasons (e.g., expense, or the like) may be considered scarcer than the storage components or resources comprising file storage tier 512. For example, in some embodiments, cache storage tier 510 may be comprised of one or more SSDs while file storage tier 512 may be comprised of one or more HDDs.

In one or more of the various embodiments, file system management server computer may be arranged to manage the distribution of file objects onto cache storage tier 510 or file storage tier 512. In some embodiments, this may include managing the demotion of file objects from cache storage to file storage or the promotion of file objects from file storage to cache storage.

Accordingly, in one or more of the various embodiments, file system management server computer may include one or more cache engines that may be instantiated to perform one or more actions to manage the promotion or demotion of file system objects to or from cache storage. In one or more of the various embodiments, cache engines may be arranged to employ one or more databases of heat extents that may be used for evaluating how to allocate cache resources of the file system.

Note, for brevity and clarity, data storage 508 is illustrated as having one cache storage tier and one file storage tier, one of ordinary skill in the art will appreciate that these innovations are not so limited. For example, in some embodiments, data storage for a file system may include two or more cache storage tiers or two or more file storage tiers. Accordingly, the innovations disclosed herein may be applied to systems having one or more cache storage tiers or one or more file storage tiers.

Figure 6:
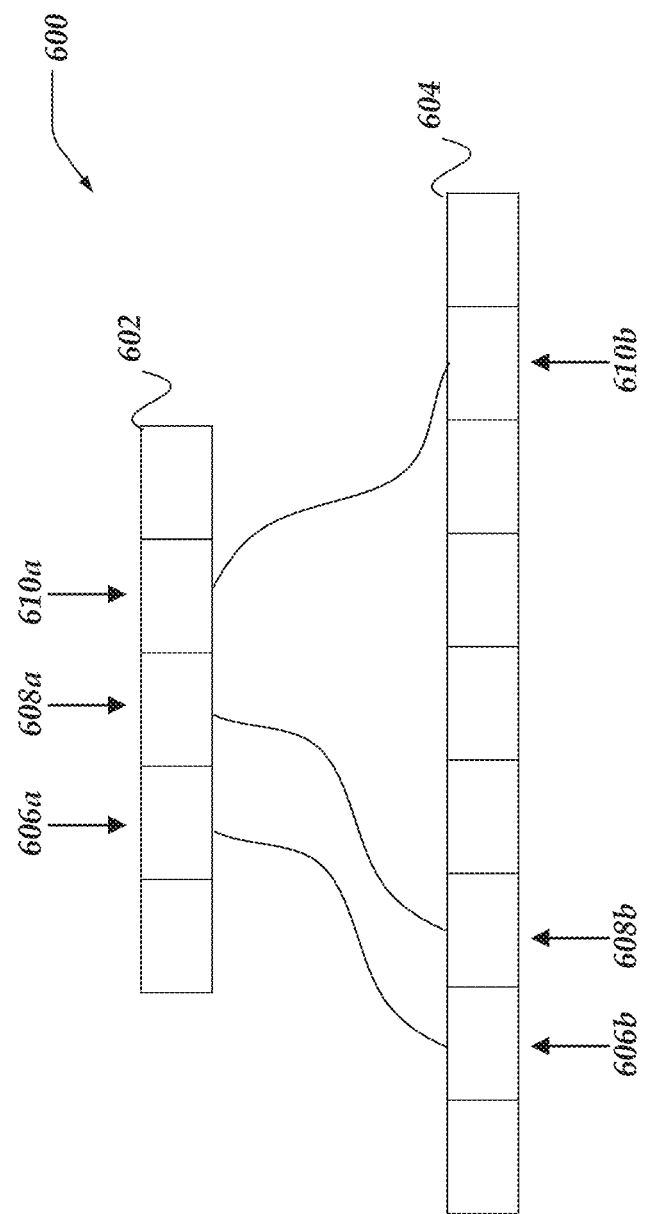
FIG. 6 illustrates data storage that includes cache storage and file storage in accordance with one or more of the various embodiments.

FIG. 6 illustrates data storage 600 that includes cache storage and file storage in accordance with one or more of the various embodiments. In one or more of the various embodiments, data storage 600 may comprise cache storage tier 602 and file storage tier 604. In one or more of the various embodiments, cache storage tier 602 may be logically comprised of a plurality of sectors, such as, sector 606*a*, sector 608*a*, sector 610*a*, or the like. Each sector may be arranged to have a specified size based on various specifications of the file system or one or more of its hardware or software components. For example, a file system may be arranged to use sectors that can store 4 KB of data. In some embodiments, the smallest file system object of a file system (e.g., blocks or pages) may be arranged to match the sector size of storage components used by a file system. In other embodiments, the block size or page size used by a file system may be independent of the sector size and enforced by one or more underlying software or hardware systems comprising the file system. In the example described in herein, for brevity and clarity, each sector may store one block. Though in some embodiments, a file system block may have a different size than a storage sector. In such cases, a sector, such as, sector 606*a* may be considered a logical sector that stores one file system block. In many embodiments, file system block size may be selected to match or align with sector sizes enforced or expected by one or more storage components comprising a file system.

In one or more of the various embodiments, file storage tier 604 also may be arranged to include a plurality of sectors, such as, 606*b*, 608*b*, 610*b*, or the like. In some embodiments, sectors on file storage tier 604 may be arranged to be the same size as sectors on cache storage tier 602. Further, in one or more of the various embodiments, file storage tier 604 may be considered to have more sectors than cache storage tier 602, though that is not a strict requirement. In some embodiments, physical or native sector sizes of cache storage tier 602 or file storage tier 604 may be different from each other. In such circumstances, a file system engine, such as, file system engine 314 may be arranged to provide logical sectors that have the same size as the file system blocks by mapping the logical sectors to one or more physical or native sectors one the storage components.

In one or more of the various embodiments, cache storage tier 602 may be arranged to the have capacity to hold fewer sectors or blocks than file storage tier 604. In some cases, cache storage may be comprised of data storage hardware that have one or more advantageous performance characteristics as compared the storage hardware comprising file storage tier 604. But, in some embodiments, cache storage may have one or more disadvantageous characteristics as well. Accordingly, in one or more of the various embodiments, selecting the amount of cache storage is based on one or more engineering trade-offs. For example, typically, storage capacity for cache storage may be more expensive that storage capacity in file storage. However, the cache storage may have performance characteristics such as, faster access, lower latency, reduced seek-time, faster reads, faster writes, or the like. For example, in some embodiments, cache storage tier 602 may be comprised of SSD storage while file storage tier 604 may be comprised of HDD storage. Accordingly, selecting a balance of cache storage to file storage may depend on the requirements of a given file system or its expected use cases. However, the innovations disclosed herein are applicable all cache storage versus file storage configurations or applications. Likewise, while most examples described herein are limited to one cache storage tier and one file storage tier, one of ordinary skill in the art will appreciate that these innovations anticipate supporting different arrangements that have more than one cache storage tier or more than one file storage tier.

In one or more of the various embodiments, blocks stored in cache storage may correspond to blocks in file storage. For example, here the block stored in sector 606*a* of cache storage tier 602 corresponds to the block stored in sector 606*b* of file storage tier 604. During normal operations, the data stored in the two sectors may be different or out-of-sync, but they may represent the same logical block that comprises the same file system object. Likewise, in this example, a block stored in sector 608*a* corresponds to the block located at sector 608*b* and another block stored in sector 610*a* corresponds to the block stored in block 610*b*.

In one or more of the various embodiments, the file system engine or cache engine may be arranged to automatically map the location or address space of the blocks to determine if a block should be accessed (e.g., read, write, modified, or the like) from cache storage or file storage. Generally, in one or more of the various embodiments, if a block is in cache storage, the version of block stored in cache storage will be used or otherwise considered the most recent version of the data being accessed.

However, in one or more of the various embodiments, cache storage may be a limited resource with a storage capacity far less than its corresponding file storage. Accordingly, in some embodiments, for caching to be effective there must be systems to move (demote) block from the cache storage to enable other blocks from the file storage to be promoted to cache storage. Conventionally, file systems that support caching provide facilities for managing the cache storage to determine if blocks from file storage should be promoted to cache storage. Likewise, in some embodiments, such facilities may be required to identify which blocks on cache storage should be demoted from cache storage. Naïve solutions, such as, first-in-first-out (FIFO), last-in-first-out (LIFO), or the like, may provide suboptimal performance because they may be unable to adapt to or account for usage patterns, user behavior, application requirements, or the like.

In one or more of the various embodiments, to account for usage patterns, user behavior, application requirements, or the like, more sophisticated cache management strategies may be employed. However, some of these management strategies often require indexing or record keeping that may requires its own storage and processing time. Accordingly, in some embodiments, as the size of file systems increase, the resources (e.g., storage, processing, or the like) required to effectively manage the cache storage increase as well. Thus, for very large distributed file systems the resources required for conventional cache management may be very expensive to maintain.

Accordingly, in one or more of the various embodiments, a cache engine may be arranged to perform actions to manage cache storage using heat extents that may improve performance or cost by providing a platform for cache management that may adapt to application/usage/behavior while reducing the storage requirements for the cache management system itself.

In one or more of the various embodiments, a cache engine, such as cache engine 324, may be arranged to compute and track heat scores for blocks in cache storage or file storage. Accordingly, in one or more of the various embodiments, the heat scores for blocks may be used in part for determining if a block should be evicted from cache storage. Briefly, if a cache engine needs to evict blocks from cache storage it may select the blocks with the lowest non-zero heat score for eviction.

Similarly, in some embodiments, cache engines may be arranged to employ one or more heuristics to determine if blocks should be promoted from file storage to cache storage. In some embodiments, cache engines may be arranged to employ metrics, such as, number of read requests, or the like, to identify blocks that may be promoted. Note, one of ordinary skill in the art will appreciate that cache engines may be arranged to employ various static or tuneable heuristics to determine if blocks should be promoted to cache storage. Accordingly, in some embodiments, cache engines may be arranged to identify blocks that may be eligible for promotion based employ rules, instructions, or the like, provided via configuration information.

In one or more of the various embodiments, cache engines may be arranged to employ one or more data structures, such as heat extents to track heat scores and other cache management information for blocks in the file system. Also, in some embodiments, cache engines may perform one or more operations that employ the information included in the heat extents to determine if blocks should be evicted from cache storage.

Heat extents are described in more detail below, but briefly, heat extents may be data structures that include information, such as: heat scores that represent the amount of activity associated with blocks; dirty flags for indicating if block contents at one location has been modified; run-length value for indicating the number of blocks represented by the extent; or the like.

FIGS. 7A-7C illustrates logical schematics of heat extents in accordance with one or more of the various embodiments.

FIG. 7A illustrates a logical schematic of heat extent 702 that is in accordance with one or more of the various embodiments. In one or more of the various embodiments, heat extents may be arranged to include several fields, such as, field 704 for storing the heat score that is associated with the extent, field 706 for indicating if the blocks are clean dirty, and field 708 for indicating the number of blocks (e.g., run-length) represented by the heat extent, or the like.

In one or more of the various embodiments, field 704 may be sized to provide a desired range of heat scores. For example, in some embodiments, if field 704 represents 4-bits that enables heat scores to range from 0 to 15. In some embodiments, heat extents may be arranged to represent different heat ranges, such as using three bits to provide a heat score range of 0-7. The selection of heat score range may depend on the amount of granularity that may be desired for cache management in a given file system balanced against the desired size or desired byte alignment of heat extents for a file system. Accordingly, in one or more of the various embodiments, file system engines or cache engines may be arranged to determine the field size or heat score ranges based on configuration information to account for local requirements or local circumstances.

In one or more of the various embodiments, blocks associated with a heat score of zero may be considered dirty or unclean. In some embodiments, this means that the block(s) in the cache are different than their counterpart blocks that may be stored in file storage or absent altogether. Thus, in some embodiments, unclean blocks cannot be evicted from cache until they have been written to file storage to persist the differences.

In one or more of the various embodiments, in this example, field 706 may be a single bit field that indicates if the blocks represented by the heat extent have a heat score of zero (indicating that they are unclean) or do they have all have the same score in field 704.

In one or more of the various embodiments, as described above, blocks may be the smallest logical file system object in a file system. Accordingly, larger file system objects (e.g., documents or files) may be comprised of many blocks that are read, written, or updated as groups or collections. For example, a document may correspond to many blocks. Accordingly, file system operations directed to the document may affect many blocks the same way. Thus, in some embodiments, a single heat extent may be arranged to represent the heat state for many similarly situated blocks. For example, if a document is comprised of 4096 (4K) blocks, each file system operation on the document may equally impact the heat state of the blocks comprising document. Accordingly, in some embodiments, one heat extent may be used to represent the heat state for many blocks with the expectation that there may be long sequences of blocks that may be affected by the same operations.

Accordingly, in one or more of the various embodiments, field 708 may be used to store a run length value that indicates how many blocks in sequential order that a heat extent represents. For example if a heat extent has a heat score of 7 and a run length of 1024, this indicates that 1024 blocks in a sequence have a heat score of 7. In one or more of the various embodiments, the maximum run length of a heat extent may depend on the overall size the heat extent data structures. In the examples here, a 16-bit long heat extent that has a heat score range of 0-15 would have 10-bits reserved for representing run length of up to 1024 blocks. In some embodiments, each run length increment may be arranged to represent one or more blocks. Similarly, in one or more of the various embodiments, there may be a minimum run length used as an offset value. For example, if the minimum run length is one block and the run length value is ten, the actual run length represented by the heat extent is eleven blocks. Also, for example, if the run length step value is ten, a run length value of 64 in a heat extent may represent an actual run length of 640 blocks.

In one or more of the various embodiments, a cache engine or file system engine may be arranged to determine heat extent properties, such as, heat score range, run length range, run length step values, run length offset values, or the inclusion of additional state flags based on configuration information. For example, some file systems may be dedicated to very large files that are usually read or written in one operation, these file systems may be configured to arrange heat extents that maximize run length representation at the expense of heat score range. In contrast, other file systems that may be optimized for more granular random access activity may be configured to use heat extents that have increased heat score range or granularity at the expense of run length range.

FIG. 7B illustrates a logical schematic of block set 710 in accordance with one or more of the various embodiments. In this example, for some embodiments, block set 710 may be considered a logical representation of several blocks that may be stored in cache storage. In this example, each position (e.g., position 716) labeled or otherwise may be considered to correspond to blocks that may be in cache storage. In one or more of the various embodiments, the blocks associated with a heat extent may be considered to be contiguous blocks (or sectors) in file storage. Thus, in some embodiments, given the starting file storage address, block-size, and run-length, heat extents provide an efficient mechanism to represent blocks that are in cache storage.

In one or more of the various embodiments, each position in block set 710 may be considered to correspond to a block in the file system. Accordingly, in some embodiments, position 716 may correspond to a particular block in the file system. Also, in some embodiments, blocks represented by heat extents may be considered to be blocks that may be in cache storage. Alternatively, in some embodiments, cache engines may be arranged to maintain heat extents for some or all of the blocks in file storage. Also, in some embodiments, a file system may have more that one level or tier of cache storage such that separate sets of heat extents may be maintained for each cache storage tier. However, for brevity and clarity, innovations herein may be described in terms of file systems that have one file storage tier and one cache storage tier. One of ordinary skill in the art will be able to appreciate that the innovations as disclosed may be applied to file systems that include more than file storage tier or more than one cache storage tier.

In one or more of the various embodiments, positions 712A in block set 710 may be considered to correspond to heat extent 712B. Likewise, position 714B in block set 710 may be considered to correspond to heat extent 714B. Accordingly, in this example, heat extent 712B includes: a heat score of 1; a flag set to indicate that the remainder of the block represented by heat extent 712B have a heat score of zero; and a run-length value of 5. Also, in this example, heat extent 714B includes: a heat score of 2; an unset flag that indicates that each block represented by heat extent 714B has the same heat score; and a run-length value of 3.

In one or more of the various embodiments, cache engines may be arranged to use the heat scores stored in heat extents to determine if clean blocks in cache storage may be evicted. Note, evicting a block from cache storage, discards that copy of the block contents that is stored in the cache storage. Thus, file system engines or cache engines may be arranged to limited the block eligible for eviction to clean blocks. However, in some embodiments, file system engines or cache engines may be arranged to flush (e.g., write) unclean block to file storage based on one or more mechanisms that are not discussed here. Accordingly, in some embodiments, unclean block may be considered ineligible for eviction until they become clean blocks—the process or determination of which block to make clean by flushing to their contents to file storage may be vary without departing from the scope of the innovations disclosed herein. E.g., one of ordinary skill in the art will be aware of various algorithms or mechanisms that may be employed to flush unclean blocks to file storage.

In one or more of the various embodiments, file system engines or cache engine may be arranged to employ one or more heuristics to determine if blocks should be promoted from file storage to cache storage. For example, in some embodiments, a cache engines may be arranged to promote blocks that are read often.

Accordingly, in some embodiments, if a file system engine has determined that a contiguous set of blocks should be promoted to cache storage, the cache engine may be arranged to generate a heat extent that corresponds to the promoted blocks. In one or more of the various embodiments, the generated heat extent may be associated with the address or location information corresponding to the location of the first block in the file storage.

In one or more of the various embodiments, if blocks are promoted from file storage to cache storage, cache engines may be arranged to assign a maximum value heat score to the corresponding heat extent. Also, in one or more of the various embodiments, if new or dirty blocks in cache storage are flushed to file storage to turn those blocks in clean blocks, cache engines may be arranged to assign a maximum heat score to the newly clean blocks. Also, in some embodiments, if blocks in cache storage are read (because of client requests to read the data included in the cached blocks), cache engines may be arranged to assign a maximum heat score value to those blocks.

Also, in one or more of the various embodiments, if blocks are evicted from cache storage, those blocks may be assigned a heat score of zero. Likewise, if blocks in stored in cache storage are written to, cache engines may be arranged to assign a heat score value of zero to those blocks because they are unclean making them ineligible for eviction until the write has been flushed to file storage.

In one or more of the various embodiments, cache engines may be arranged to decrement heat scores based on the number of blocks in cache storage and their heat score distribution. In some embodiments, cache engines may be arranged to favor or enforce a particular distribution of heat scores. Accordingly, in some embodiments, if the distribution heat scores associated with blocks in cache engines violates one or more policies, cache engines may be arranged to decrement the hear score values for one or more blocks to accommodate the one or more policies. In some embodiments, cache engines may be arranged to generate threshold values for triggering cooling operations based on dividing the block capacity of the cache storage by the range of heat score. For example, if the heat score range for a file system is 15, cache engines may be arranged to perform cooling actions if the number of blocks with a maximum heat score (e.g., blocks having a heat score of 15) exceed $\frac{1}{15}$ of the capacity of the cache storage. Note, in some embodiments, cache engines may be arranged to employ different cooling functions based on rules, instructions, threshold values, formulas, or the like, provided via configuration information to account for local requirement of local circumstances.

In one or more of the various embodiments, if cooling may be triggered, cache engines may decrement the heat score value by one for each block in the cache storage and update the corresponding heat extents. In one or more of the various embodiments, the heat score for blocks associated with a heat score of one or zero may remain unchanged. For example, in one or more of the various embodiments, if a block is promoted to cache storage, its associated heat extent may assigned a heat score of 15. And, in this example, if the cache storage is cooled, the heat score for that heat extent may be decremented to 14. Accordingly, in some embodiments, the heat score for a set of block may gradually fall until the score reaches a value of 1. However, in some embodiments, if the blocks are read from cache storage before being evicted, the heat score for the blocks may be increased back to the maximum value.

In one or more of the various embodiments, cache engines may be arranged to employ one or more policies for determining if blocks should be evicted from cache storage. As mentioned, in one or more of the various embodiments, block associated with a heat score of zero may be ineligible for eviction because the version of the block in cache storage include data that has not been flush to file storage. In some embodiments, the remaining (non-zero heat) blocks may be considered for eviction in reverse order of there heat scores. Accordingly, in some embodiments, cache engines may be arranged to favor evicting eligible blocks that have the lowest heat scores first. Thus, for example, if there may be sufficient blocks with a heat score of 1, those blocks may be evicted. Alternatively, in some embodiments, if the number of blocks with the lowest heat score is not sufficient, cache engines may be arranged to select blocks having the next higher score, such as, blocks associated with a heat score of 2.

In some embodiments, file system engines may be arranged to maintain summary information that tracks the blocks at a given heat score for different portions of the cache storage.

FIG. 7C illustrates a logical representation for splitting or combining heat extents in accordance with one or more of the various embodiments. In one or more of the various embodiments, a heat extent represents heat state for a number of blocks as defined by the run length value of the heat extent. Accordingly, in one or more of the various embodiments, if there may be changes to some of the blocks represented by the heat extent and not to other blocks represented by the same heat extent, a cache engine may be arranged to split one heat extent into two or more heat extents. Likewise, in one or more of the various embodiments, the cache engine may be arranged to combine two or more heat extents into one heat extent if the blocks associated with the two or more coalesced heat extents have similar heat state.

In this example, in one or more of the various embodiments, heat extent 720 may be considered to be associated with 256 sequential blocks in a file system. In this example, heat extent 720 represents 256 blocks that may be on cache storage and that are clean. Note, in this example, the blocks are considered clean because the block content on cache storage is the same as the block content on file storage. Next, in this example, if a write operation on behalf of a client changes the content in cache storage for some of the 256 blocks represented by heat extent 720, the cache engine may be arranged to split heat extent 720 into three heat extents, shown here as heat extent 722, heat extent 724, and heat extent 726. Accordingly, in this example, heat extent 722 represents the first 64 blocks that were previously represented by heat extent 720 that were not changed by the write operation. And, in this example, heat extent 724 represent a heat extent for the blocks that were written. And, in this example, heat extent 726 has been created to represent the 191 blocks of the 256 blocks previously represented by heat extent 720 that remain unmodified by the write operation. Note, the heat score for the blocks associated heat extent 724 have been set to 0 to indicate that those are not eligible for eviction because the writes to those blocks has not been flushed to file storage.

Also, in one or more of the various embodiments, cache engines may be arranged to combine or coalesce two or more heat extents into one heat extent. This operation may be considered similar to reversing the split operation described above. In one or more of the various embodiments, the cache engine may identify two or more adjacent heat extents that have the same or similar heat state, and merge them into one heat extent that represents the blocks associated with the two or more combined heat extents.

In one or more of the various embodiments, coalescing may be restricted by the run length range of the heat extents. For example, if a file system is arranged to employ heat extents that have a run length range of 1024 blocks, the maximum number of blocks that may be represented by a combined heat extent is 1024. Thus, for example, combining four adjacent heat extents having run lengths of 128, 256, 512, 684 respectively may result in a first heat extent having a run length of 1024 and a second heat extent having a run length of 556. Note, in one or more of the various embodiments, cache engine coalescing policies may determine the distribution of blocks among combined heat extents. For example, an alternative coalescing policy may produce two adjacent heat extents with run lengths of 790 rather using the maximum run length for the first heat extent.

Figure 8:
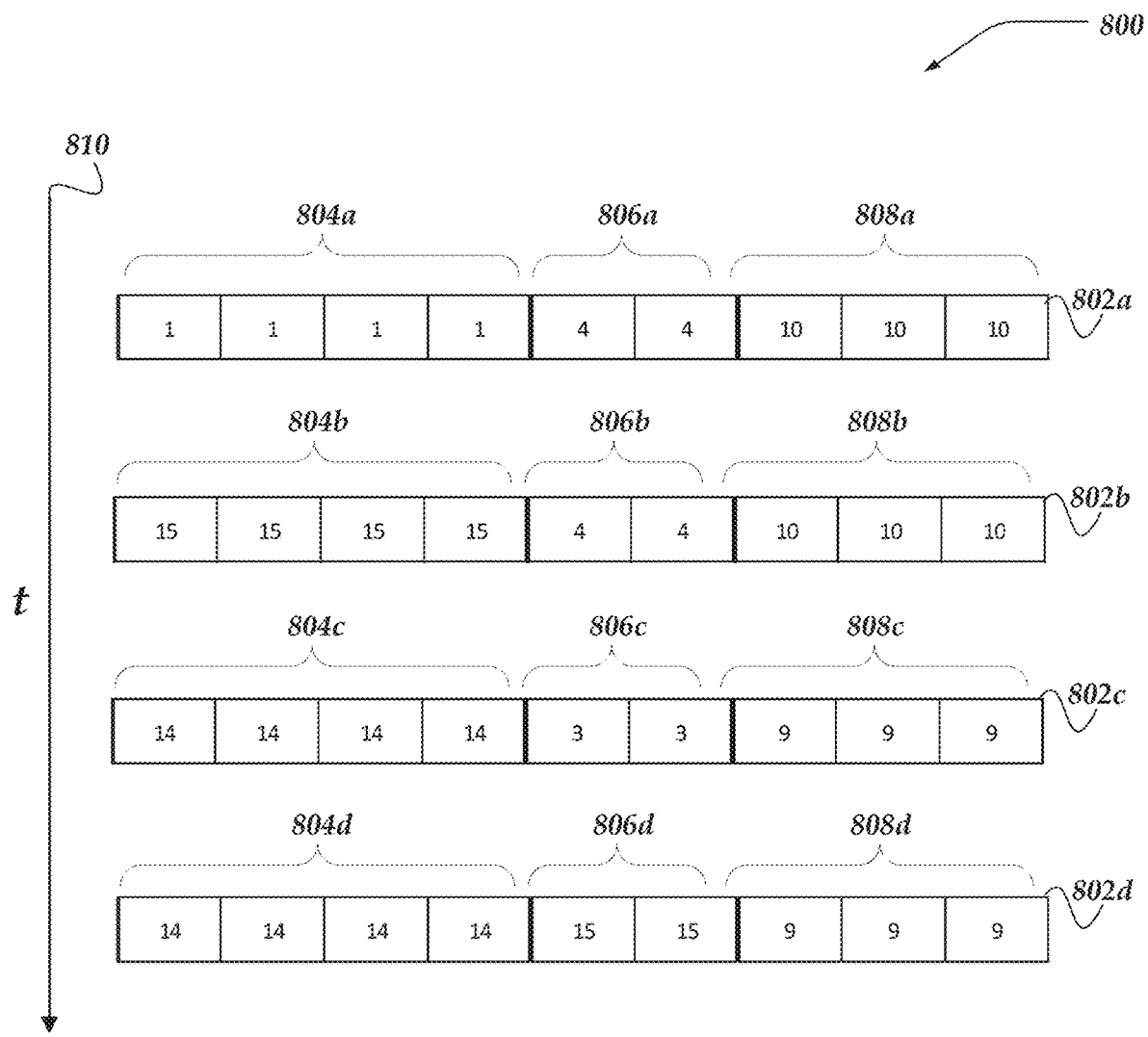
FIG. 8 illustrates a logical schematic of a portion of cache storage that shows how heat scores may be updated as part of storage tier management for file systems in accordance with one or more of the various embodiments.

FIG. 8 illustrates a logical schematic of a portion of cache storage 800 that shows how heat scores may be updated as part of storage tier management for file systems in accordance with one or more of the various embodiments. As described above, in some embodiments, cache engines may be arranged to associate blocks in cache storage with heat extents. Accordingly, in some embodiments, heat extents, among other things, may be employed to track heat scores that may be employed to determine which blocks should be evicted from cache storage if space is needed for other blocks.

This example is provided to clarify how heat scores may be updated during the operation of the file system. Accordingly, in this example, cache storage 802a-d represent that same cache storage at different times; arrow 810 represents the passage of time; heat extent 804a, heat extent 806a, and heat extent 808a represent heat extents at an initial time.

In this example, heat extent 804a has a heat score of 1, heat extent 806a represents blocks with a heat score of 4, and heat extent 808a represents blocks in cache storage with a heat score of 10.

In this example, cache storage 802a illustrates that the cache storage is full of blocks. Accordingly, if a cache engine or file system engine promotes blocks from file storage (not shown) or block in the cache are read, cache engine may be arranged to increase the heat score of the promoted/read blocks to the maximum heat score value.

In some embodiments, if the file system engine or cache engine determines that blocks from file storage should be promoted into a full cache storage, the file system engine or cache engine may be arranged to determine one or more blocks to evict from cache to make room for the promoted blocks. Accordingly, in some embodiments, the blocks with the lowest heat score may be evicted to make room for the incoming promoted blocks. Alternatively, in this example, if the blocks associated with heat extent are read, the heat score for those blocks may be set to maximum heat score (e.g., 15 in this example) rather than requiring an eviction. Thus, in this example, cache storage 802b shows the heat scores after blocks associated with heat extent 804b have had their heat scores set to maximum because those blocks were promoted or read while the other blocks in cache storage 802-b remain unchanged.

As described above, in one or more of the various embodiments, if the number of blocks with maximum valued heat scores exceeds a threshold value, cache engines may be arranged to decrement the heat scores of each block in the cache storage. Accordingly, in this example, cache storage 802c shows that heat scores for blocks included in cache storage 802c have been decremented to reduce the heat scores.

Finally, in this example, cache storage 802d shows that the blocks associated with 806d have been read, triggering the cache engine to set the heat score of those blocks to maximum values.

Generalized Operations

Figure 9:
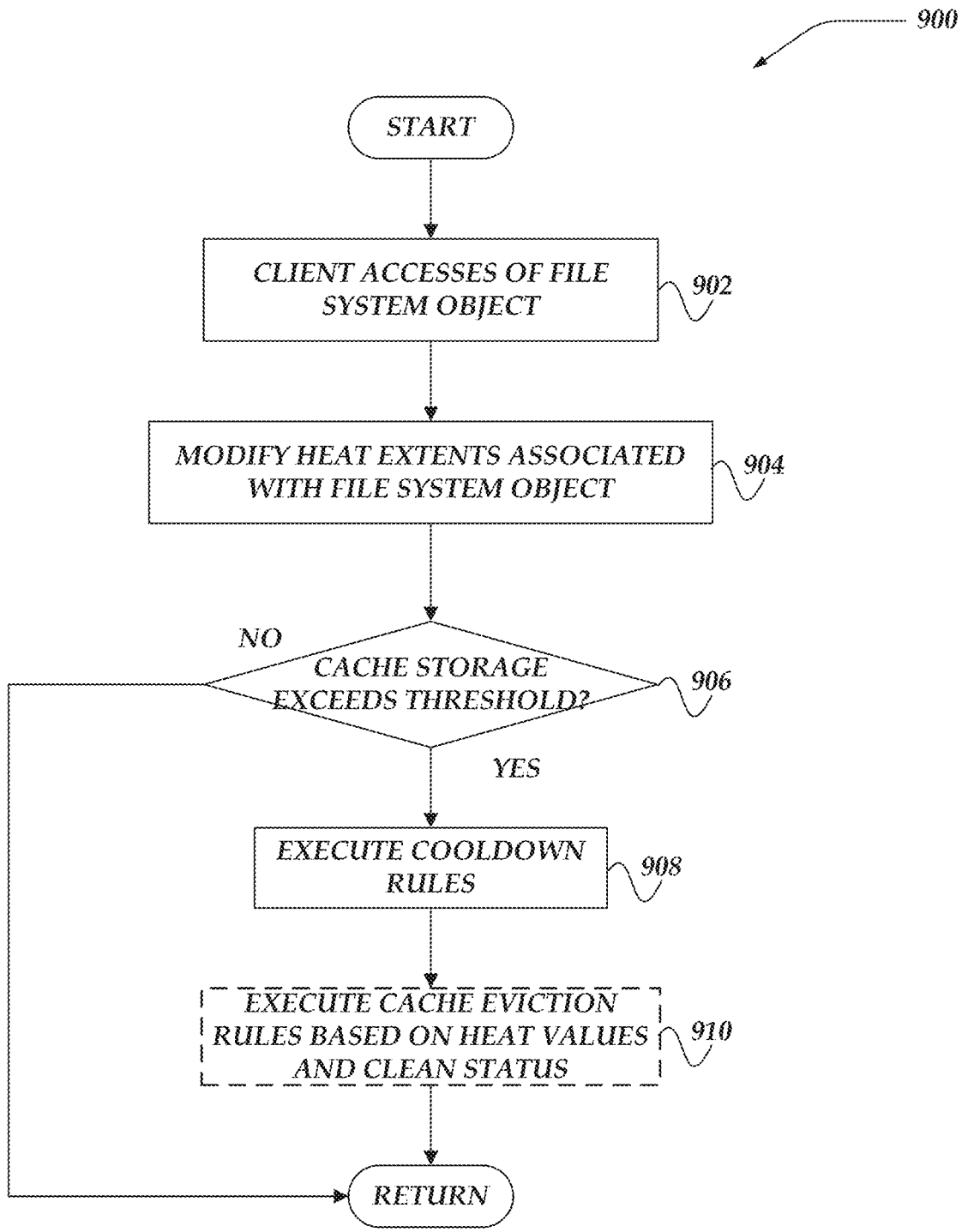
FIG. 9 illustrates an overview flowchart of a process for storage tier management for file systems in accordance with one or more of the various embodiments.
Figure 10:
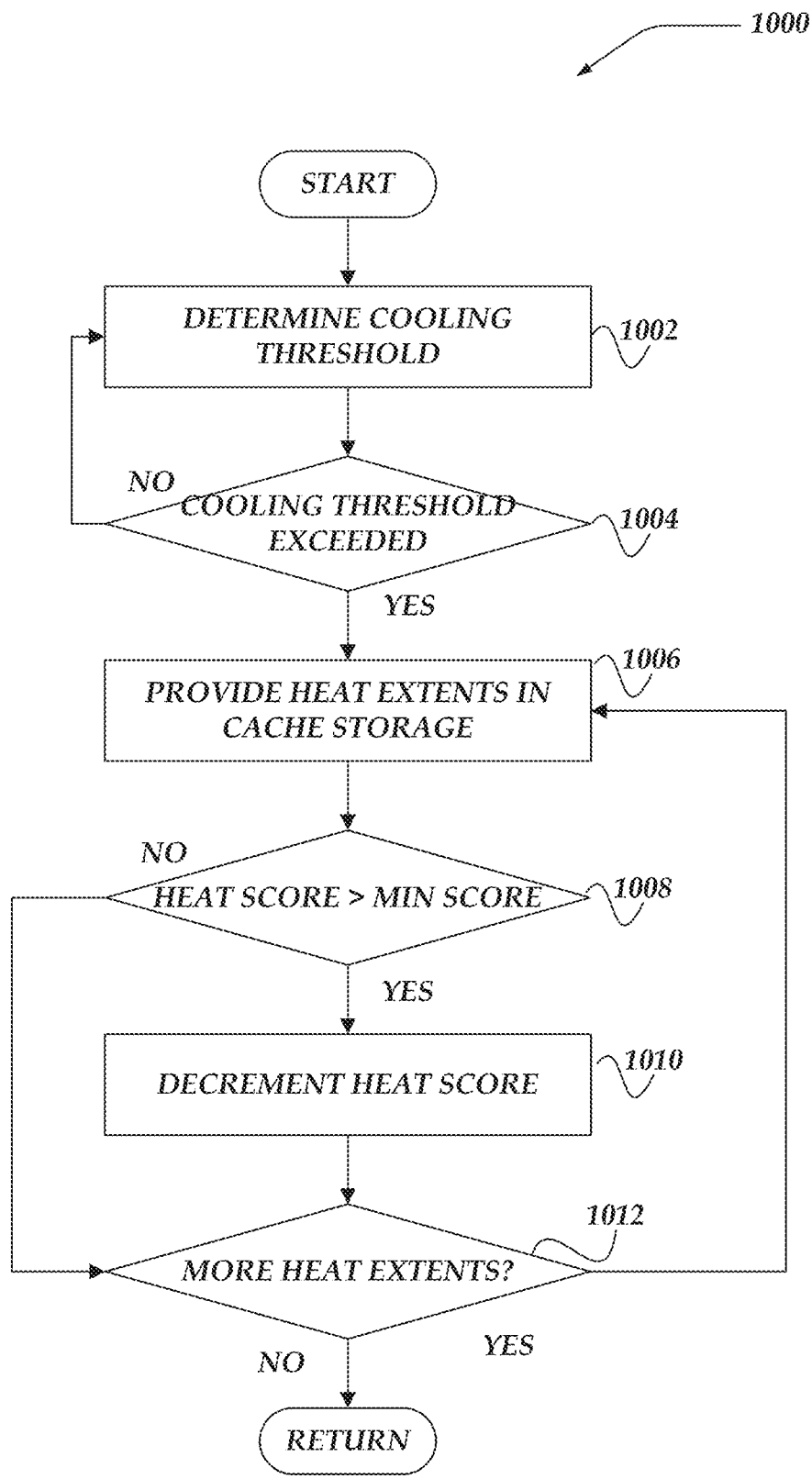
FIG. 10 illustrates a flowchart of a process for storage tier management for file systems in accordance with one or more of the various embodiments.
Figure 11:
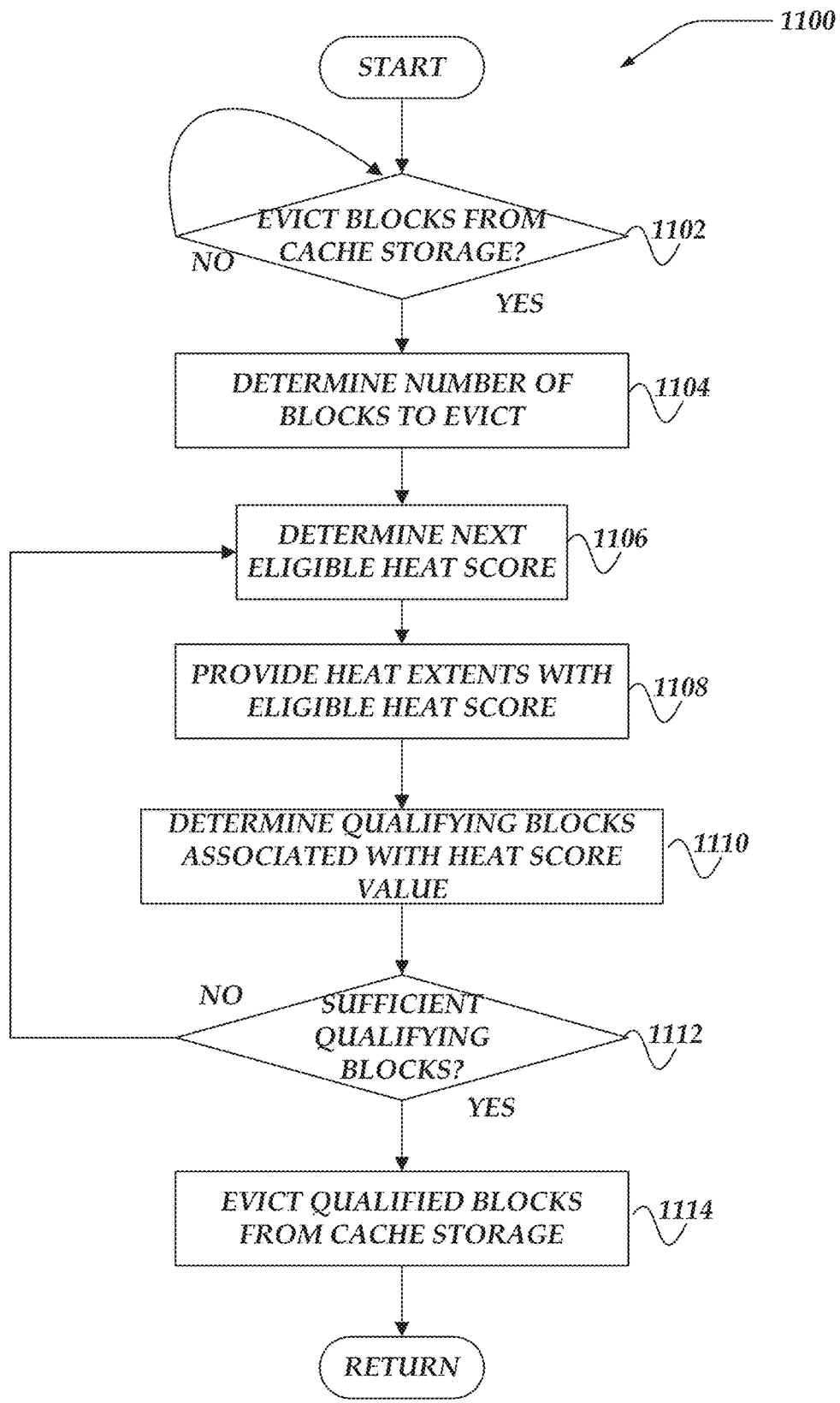
FIG. 11 illustrates a flowchart of a process for evicting blocks from cache storage for storage tier management for file systems in accordance with one or more of the various embodiments.

FIGS. 9-11 represent generalized operations for storage tier management for file systems in accordance with one or more of the various embodiments. In one or more of the various embodiments, processes 900, 1000, and 1100 described in conjunction with FIGS. 9-13 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-11 may perform actions for storage tier management for file systems in accordance with at least one of the various embodiments or architectures such as those described in conjunction with FIGS. 4-8. Further, in one or more of the various embodiments, some or all of the actions performed by processes 900, 1000, and 1100 may be executed in part by file system engine 322, or cache engine 324 running on one or more processors of one or more network computers.

FIG. 9 illustrates an overview flowchart of process 900 for storage tier management for file systems in accordance with one or more of the various embodiments. After a start flowchart block, at flowchart block 902, in one or more of the various embodiments, one or more clients may access one or more file system objects in a file system. In one or more of the various embodiments, clients (e.g., users, applications, services, or the like) interact with file system objects by reading or writing (including deletes or unlinks) the contents of one or more blocks that may comprise a given file system object.

At flowchart block 904, in one or more of the various embodiments, the cache engine may be arranged to modify one or more heat extents that may be associated with the one or more file system objects. Accordingly, in one or more of the various embodiments, cache engines may be arranged to determine one or more heat extents that are associated with the blocks being accessed. As described above, and in more detail below, block identifiers or index values provided by the file system engine may be used to identify the heat extents that represent the one or more blocks being accessed. In some embodiments, block identifiers may be associated with where the block is stored on file storage. For example, in some embodiments, block 002 comes before block 003 on file storage. In some embodiments, block identifiers and block positions correspond to sector locations on HDDs comprising file storage such that reading five blocks in sequence from file storage may be involve reading five sectors in order from a HDD.

In one or more of the various embodiments, the cache engine may be arranged to modify the heat score of a heat extent based on the current heat score, desired heat score distribution, the type of access (e.g., read or write), or the like. In some embodiments, additional metrics or factors may be applied to influence whether a heat score should be increased or decreased. For example, in one or more of the various embodiments, each time one or more blocks are read by a client of the file system, the cache engine may be arranged to increase the heat scores associated with those blocks. Accordingly, in one or more of the various embodiments, in response to activity directed to a block, the cache engine may determine the heat extents that may be associated with the one or more blocks to increase the heat score of the determined heat extents. In some embodiments, cache engines may be arranged to set the heat score to a maximum value if the blocks are being read or promoted from file storage to cache storage. In some embodiments, blocks that are associated with a zero heat score may be considered unclean such that some or all of the information/data in cache storage is different that than what it stored in file storage.

In some embodiments, the cache engine may be arranged to modify one or more heat scores as part of maintenance operations, such as, coalescing heat extents, re-balancing heat score distributions, or the like.

At decision block 906, in one or more of the various embodiments, if an amount memory consumed by blocks in cache storage with a maximum heat score value exceeds a defined threshold, control may flow to flowchart block 910; otherwise, control may be returned to a calling process. In one or more of the various embodiments, cache management operations related to heat extents, such as, cooldown, coalescing, demotion, promotion, re-balancing, or the like, may be suspended until the utilization of cache storage exceeds a defined threshold.

At flowchart block 908, in one or more of the various embodiments, the cache engine may be arranged to execute or initiate one or more cache management operations including cooldown, coalescing, demotion, promotion, re-balancing, or the like. In one or more of the various embodiments, as blocks are accessed, the heat scores of heat extents that represent those blocks may be increased according one or more heat policies. Likewise, in one or more of the various embodiments, the cache engine may be arranged to execute one or more cooldown policies that act to decrease the heat scores of heat extents that represent blocks based on access activity. For example, in some embodiments, heat scores associated with heat extents that represent less frequently accessed blocks may be decreased accordingly one or more cooldown policies.

In one or more of the various embodiments, the cache engine may be arranged to execute cooldown policies that consider additional metrics, such as, size of reads, size of writes, heat scores or access activity associated with neighboring blocks, or the like. Likewise, in some embodiments, one or more cooldown policies may be arranged to modify one or more heat scores such that the heat score distribution in a heat extent group or the file system as a whole, conform to one or more heat distribution models.

At flowchart block 910, in one or more of the various embodiments, optionally, the cache engine may be arranged to execute or initiate one or more cache promotion rules or demotion rules based on heat scores associated with one or more heat extents. In one or more of the various embodiments, generally, the cache engine may be arranged to promote blocks associated with higher heat scores to cache storage and demote blocks associated with lower heat scores to file storage. In one or more of the various embodiments, the details of promoting blocks to cache storage or demoting block from file storage may depend on rule based policies that may be arranged to consider additional file system performance metrics.

Note, this flowchart block is indicated as being optional because in some embodiments cache eviction rules may be executed by one or more background processes/services that may operate independently of client interaction with the file system.

Next, in some embodiments, control may be returned to a calling process.

FIG. 10 illustrates a flowchart of process 1000 for storage tier management for file systems in accordance with one or more of the various embodiments. After a start flowchart block, at flowchart block 1002, in one or more of the various embodiments, cache engines may be arranged to determine the current cooling threshold value. As described above, in some embodiments, cache engines may be arranged to evaluate the heat scores or heat score distribution for the cache storage to determine if cool down should occur. In some embodiments, cache engines may be arranged to determine the threshold value based on the capacity of the cache storage and range of heat score values.

In one or more of the various embodiments, cache engines may be arranged to determine a threshold value by dividing the maximum number of blocks (e.g., block capacity) that may be stored in the cache storage by the range of heat scores. For example, in some embodiments, if a cache storage can store 1500 blocks and heat scores may range from 1-15, the cool down threshold may be determined to 1500/15=100.

In one or more of the various embodiments, cache engine may be arranged to compare the cool down threshold value with the number of blocks that are at the maximum score. In some embodiments, if the number of blocks in cache storage exceed the threshold value, cache engine may be arranged to initiate cool down.

At decision flowchart block 1004, in one or more of the various embodiments, if the cool down threshold may be exceeded, control may flow to block 1006; otherwise, control may loop back to block 1002. In one or more of the various embodiments, cache engines or file system engines may be arranged to maintain a running summary of the number of blocks in cache storage at each heat score value making the number of blocks associated with maximum heat scores readily available to cache engines or file system engines.

At flowchart block 1006, in one or more of the various embodiments, cache engines may be arranged to provide the heat extents in cache storage. In one or more of the various embodiments, cache engines may be arranged to iterate over each heat extent associated with blocks that may be in cache storage.

At flowchart decision block 1008, in one or more of the various embodiments, if the heat score associated with a heat extent exceeds the minimum heat score value, control may flow to block 1010; otherwise, control may flow to decision block 1012. In one or more of the various embodiments, blocks that are unclean (e.g., heat score of 0) may be excluded from cooling until the are made clean by flushing their content to file storage. Also, in some embodiments, blocks that may be already at the lowest heat score (e.g., 1) may be excluded from cooling. Accordingly, in some embodiments, cache engines may be arranged to decrement the heat score for each heat extent in the cache storage that is not 0 or 1.

At flowchart decision block 1012, in one or more of the various embodiments, if more heat extent may be available for processing, control may loop back to block 1006; otherwise, control may be returned to a calling process. As described above, Next, in one or more of the various embodiments, control may be returned to a calling process.

FIG. 11 illustrates a flowchart of process 1100 for evicting blocks from cache storage for storage tier management for file systems in accordance with one or more of the various embodiments. After a start flowchart block, at flowchart decision block 1102, in one or more of the various embodiments, if file system engines or cache engines determine that one or more blocks may be evicted from cache storage, control may flow to flowchart block 1104; otherwise, control may loop back to flowchart block 1102. As described above, file system engines or cache engines may be arranged to enforce one or more eviction policies that determine if blocks should be evicted from cache storage. In one or more of the various embodiments, the particular triggers or conditions may vary depending on the application of the file system. In some embodiments, cache engine may be arranged to periodically evict blocks. Also, in one or more of the various embodiments, file system engines or cache engine may be arranged to initiate evictions on demand based on one or more policies associated with promoting blocks from file storage to cache storage. Accordingly, in some embodiments, cache engines may be arranged to determine eviction policy based on rules, instructions, threshold values, or the like, provided via configuration information to account for local circumstances or local requirements.

At flowchart block 1104, in one or more of the various embodiments, cache engines may be arranged to determine the number of blocks to evict. In one or more of the various embodiments, eviction requests may provide a number of blocks to evict. For example, in some embodiments, if eviction is triggered to make room for blocks that are eligible for promotion, the eviction request may include the number of blocks that need to be promoted. Also, in some embodiments, eviction requests may directed to blocks associated with certain heat scores. For example, in some embodiments, an eviction request may request that all blocks with the lowest heat score (e.g., 1) be evicted.

Accordingly, in some embodiments, cache engines may be provided the number of blocks that need to evicted.

At flowchart block 1106, in one or more of the various embodiments, cache engines may be arranged to determine a next eligible heat score for eviction. In one or more of the various embodiments, cache engines may be arranged to determine blocks that qualify for eviction based on the heat scores such that blocks associated with lower heat scores may be evicted before blocks with higher scores.

Accordingly, in some embodiments, cache engines may be arranged to determine a heat score that determines if blocks in cache storage may be eligible for eviction. Thus, in some embodiments, cache engine may be arranged to determine an initial eligible heat score to be the lowest supported heat score (e.g., 1). In some embodiments, if the number of blocks associated with previous/current eligible heat scores does not provide enough blocks that qualify for eviction, cache engines may be arranged to increment the eligible heat score to the next value.

At flowchart block 1108, in one or more of the various embodiments, cache engines may be arranged to provide the heat extents that may be associated with the eligible heat score. In one or more of the various embodiments, cache engine may be arranged to employ heat extents to determine the number of blocks that may be associated with the current eligible heat score. For example, in some embodiments, if the current eligible heat score may be 1, a heat extent with a run-length of 200 and a heat score value of 1 may provide 200 blocks that may be qualified for eviction.

At flowchart block 1110, in one or more of the various embodiments, cache engines may be arranged to determine zero or more qualifying blocks that may be associated with the current eligible heat score. In one or more of the various embodiments, cache engines may be arranged to favor evicting blocks associated with the lowest heat score value. However, in some circumstances, the number of blocks with the lowest heat score value may not satisfy the eviction request. Accordingly, in some embodiments, if the number of blocks currently qualified for eviction does not satisfy the eviction request, cache engines may be arranged to continue searching for qualified block that may have higher heat scores. Thus, in some embodiments, cache engines may be arranged to maintain a running counter of the blocks that may be eligible for eviction.

Note, in some embodiments, cache engines may be arranged to maintain a real-time record of the number of blocks associated with each score. Accordingly, in some embodiments, cache engines may determine if there are sufficient qualified blocks for a given eligible heat score based on summary information. However, in some embodiments, determining the particular heat extents or blocks in cache storage that may be eligible for eviction may still require that the heat extent for cache storage be examined.

At flowchart decision block 1112, in one or more of the various embodiments, if there may be sufficient qualifying blocks, control may flow to flowchart block 1114; otherwise, control may loop back to flowchart block 1106.

At flowchart block 1114, in one or more of the various embodiments, cache engines may be arranged to evict the one or more qualified blocks from cache storage. In one or more of the various embodiments, evicted blocks may be discarded. In one or more of the various embodiments, cache engines may be arranged to discard qualified blocks by marking their locations in cache storage as being empty or available. In some embodiments, if the content may be considered sensitive, cache engines may be arranged to force one or more actions to protect the content of the discarded blocks, such as, writing to the block locations in cache storage to mask or obscure the contents of discarded blocks.

In some embodiments, if heat extents with an eligible heat score values have run-lengths that represents more blocks than needed to satisfy the eviction request, cache engines may be arranged to split heat extents. For example, in some embodiments, if a cache engine may be requested to evict 200 blocks and a heat extent with an eligible heat score has a run-length of 1200, the cache engine may be arranged to evict 200 blocks associated with the heat extent and then update the heat extent by reducing its run-length by 200 to reflect the 200 blocks have been evicted.

Next, in one or more of the various embodiments, control may be returned to a calling process.

What is claimed as new and desired to be protected by Letters Patent of the United States is:

1. A method for managing data in a file system over a network using one or more processors that execute instructions to perform actions, comprising:
   providing a file system that includes a file storage tier and a cache storage tier, wherein the file system stores a plurality of blocks in the file storage tier and a portion of the plurality of blocks in the cache storage tier, and wherein each block in the cache storage tier is associated with a heat score;
   determining an amount of two or more hot blocks present in the cache storage tier that are associated with the heat score that matches a maximum heat score value;
   in response to the amount of the two or more hot blocks exceeding an amount of a threshold value, performing further actions, including:
      determining each cooldown block in the cache storage tier based on each heat score associated with each block in the cache storage tier, wherein each cooldown block is a block associated with a heat score that exceeds a minimum heat score value, and wherein each heat score associated with each block is represented separate from a different representation for a clean status that is associated with each block in the cache storage tier; and
      decrementing the heat score associated with each cooldown block; and
   in response to the amount of the two or more hot blocks being less than the amount of the threshold value, suspending one or more types of actions for managing operation of the cache storage tier until the amount of the threshold value is exceeded, wherein the one or more types of actions include cooldown, coalescing, demotion, promotion, or re-balancing;
   in response to one or more blocks in the cache storage tier being read, setting the heat score associated with the one or more blocks being read to the maximum heat score value; and
   in response to a request to evict an amount of the portion of the plurality of blocks stored in the cache storage tier, iteratively qualifying for eviction one or more of the amount of blocks until the entire amount is qualified and is then evicted based on the request, the clean status associated with each of the one or more blocks, the heat score associated with each of the one or more blocks, and a contiguous run-length for two or more blocks stored in the cache storage tier that have a same heat score that is less-than or equal to an evicted heat score, wherein each evicted block is associated with the clean status and the evicted heat score that is less-than or equal to the non-evicted heat score of each block of the portion of the plurality of blocks that remain stored in the cache storage tier.

2. The method of claim 1, further comprising:
determining one or more other blocks that are eligible for storing in the cache storage tier based on one or more cache policies and file system activity that is associated with the one or more other blocks; and
storing the one or more other blocks in the cache storage tier, wherein each heat score associated with the one or more other blocks is set to the maximum heat score value.

3. The method of claim 1, further comprising:
in response to writing to the one or more blocks in the cache storage tier, setting the heat score associated with the one or more blocks to the maximum heat score value.

4. The method of claim 1, further comprising:
in response to the file system restarting after being shutdown while the portion of the plurality of blocks is in the cache storage tier, performing further actions, including:
determining each block in the cache storage tier based on the file system and the cache storage; and
setting the heat score for each block in the cache storage tier to an initial heat score value.

5. The method of claim 1, further comprising:
providing one or more heat extents that include a heat score and a run-length; and
associating one or more blocks of the portion of the plurality of blocks in the cache storage tier with each heat extent based on a location of each block in the cache storage tier and the heat score of each block, wherein each block associated with each heat extent is contiguous to each other in the cache storage tier and each block associated with each heat extent has the same heat score, and wherein the run-length associated with each heat extent is set to a number of the one or more blocks associated with it.

6. A network computer for managing data in a file system over a network, comprising:
a memory that stores at least instructions; and one or more processors that execute instructions that perform actions, including:
providing a file system that includes a file storage tier and a cache storage tier, wherein the file system stores a plurality of blocks in the file storage tier and a portion of the plurality of blocks in the cache storage tier, and wherein each block in the cache storage tier is associated with a heat score;
determining an amount of two or more hot blocks present in the cache storage tier that are associated with the heat score that matches a maximum heat score value;
in response to the amount of the two or more hot blocks exceeding an amount of a threshold value, performing further actions, including:
determining each cooldown block in the cache storage tier based on each heat score associated with each block in the cache storage tier, wherein each cooldown block is a block associated with a heat score that exceeds a minimum heat score value, and wherein each heat score associated with each block is represented separate from a different representation for a clean status that is associated with each block in the cache storage tier; and
decrementing the heat score associated with each cooldown block; and
in response to the amount of the two or more hot blocks being less than the amount of the threshold value, suspending one or more types of actions for managing operation of the cache storage tier until the amount of the threshold value is exceeded, wherein the one or more types of actions include cooldown, coalescing, demotion, promotion, or re-balancing;
in response to one or more blocks in the cache storage tier being read, setting the heat score associated with the one or more blocks being read to the maximum heat score value; and
in response to a request to evict an amount of the portion of the plurality of blocks stored in the cache storage tier, iteratively qualifying for eviction one or more of the amount of blocks until the entire amount is qualified and is then evicted based on the request, the clean status associated with each of the one or more blocks, the heat score associated with each of the one or more blocks, and a contiguous run-length for two or more blocks stored in the cache storage tier that have a same heat score that is less-than or equal to an evicted heat score, wherein each evicted block is associated with the clean status and the evicted heat score that is less-than or equal to the non-evicted heat score of each block of the portion of the plurality of blocks that remain stored in the cache storage tier.

7. The network computer of claim 6, wherein the one or more processors execute instructions that perform actions, further comprising:
determining one or more other blocks that are eligible for storing in the cache storage tier based on one or more cache policies and file system activity that is associated with the one or more other blocks; and
storing the one or more other blocks in the cache storage tier, wherein each heat score associated with the one or more other blocks is set to the maximum heat score value.

8. The network computer of claim 6, wherein the one or more processors execute instructions that perform actions, further comprising:
in response to writing to the one or more blocks in the cache storage tier, setting the heat score associated with the one or more blocks to the maximum heat score value.

9. The network computer of claim 6, wherein the one or more processors execute instructions that perform actions, further comprising:
in response to the file system restarting after being shutdown while the portion of the plurality of blocks is in the cache storage tier, performing further actions, including:
determining each block in the cache storage tier based on the file system and the cache storage; and
setting the heat score for each block in the cache storage tier to an initial heat score value.

10. The network computer of claim 6, wherein the one or more processors execute instructions that perform actions, further comprising:
providing one or more heat extents that include a heat score and a run-length; and
associating one or more blocks of the portion of the plurality of blocks in the cache storage tier with each heat extent based on a location of each block in the cache storage tier and the heat score of each block, wherein each block associated with each heat extent is contiguous to each other in the cache storage tier and each block associated with each heat extent has the same heat score, and wherein the run-length associated with each heat extent is set to a number of the one or more blocks associated with it.

11. A processor readable non-transitory storage media that includes instructions for managing data in a file system over a network, wherein execution of the instructions by one or more processors on one or more network computers performs actions, comprising:
providing a file system that includes a file storage tier and a cache storage tier, wherein the file system stores a plurality of blocks in the file storage tier and a portion of the plurality of blocks in the cache storage tier, and wherein each block in the cache storage tier is associated with a heat score;
determining an amount of two or more hot blocks present in the cache storage tier that are associated with the heat score that matches a maximum heat score value;
in response to the amount of the two or more hot blocks exceeding an amount of a threshold value, performing further actions, including:
determining each cooldown block in the cache storage tier based on each heat score associated with each block in the cache storage tier, wherein each cooldown block is a block associated with a heat score that exceeds a minimum heat score value, and wherein each heat score associated with each block is represented separate from a different representation for a clean status that is associated with each block in the cache storage tier; and
decrementing the heat score associated with each cooldown block; and
in response to the amount of the two or more hot blocks being less than the amount of the threshold value, suspending one or more types of actions for managing operation of the cache storage tier until the amount of the threshold value is exceeded, wherein the one or more types of actions include cooldown, coalescing, demotion, promotion, or re-balancing;

in response to one or more blocks in the cache storage tier being read, setting the heat score associated with the one or more blocks being read to the maximum heat score value; and in response to a request to evict an amount of the portion of the plurality of blocks stored in the cache storage tier, iteratively qualifying for eviction one or more of the amount of blocks until the entire amount is qualified and is then evicted based on the request, the clean status associated with each of the one or more blocks, the heat score associated with each of the one or more blocks, and a contiguous run-length for two or more blocks stored in the cache storage tier that have a same heat score that is less-than or equal to an evicted heat score, wherein each evicted block is associated with the clean status and the evicted heat score that is less-than or equal to the non-evicted heat score of each block of the portion of the plurality of blocks that remain stored in the cache storage tier.

12. The media of claim 11, further comprising:

determining one or more other blocks that are eligible for storing in the cache storage tier based on one or more cache policies and file system activity that is associated with the one or more other blocks; and storing the one or more other blocks in the cache storage tier, wherein each heat score associated with the one or more other blocks is set to the maximum heat score value.

13. The media of claim 11, further comprising:

in response to writing to the one or more blocks in the cache storage tier, setting the heat score associated with the one or more blocks to the maximum heat score value.

14. The media of claim 11, further comprising:

in response to the file system restarting after being shutdown while the portion of the plurality of blocks is in the cache storage tier, performing further actions, including:

determining each block in the cache storage tier based on the file system and the cache storage; and setting the heat score for each block in the cache storage tier to an initial heat score value.

15. The media of claim 11, further comprising:

providing one or more heat extents that include a heat score and a run-length; and associating one or more blocks of the portion of the plurality of blocks in the cache storage tier with each heat extent based on a location of each block in the cache storage tier and the heat score of each block, wherein each block associated with each heat extent is contiguous to each other in the cache storage tier and each block associated with each heat extent has the same heat score, and wherein the run-length associated with each heat extent is set to a number of the one or more blocks associated with it.

16. A system for managing data in a file system over a network, comprising:

a network computer, comprising:

a memory that stores at least instructions; and one or more processors that execute instructions that perform actions, including:

providing a file system that includes a file storage tier and a cache storage tier, wherein the file system stores a plurality of blocks in the file storage tier and a portion of the plurality of blocks in the cache storage tier, and wherein each block in the cache storage tier is associated with a heat score;

determining an amount of two or more hot blocks present in the cache storage tier that are associated with the heat score that matches a maximum heat score value;

in response to the amount of the two or more hot blocks exceeding an amount of a threshold value, performing further actions, including:

determining each cooldown block in the cache storage tier based on each heat score associated with each block in the cache storage tier, wherein each cooldown block is a block associated with a heat score that exceeds a minimum heat score value, and wherein each heat score associated with each block is represented separate from a different representation for a clean status that is associated with each block in the cache storage tier; and decrementing the heat score associated with each cooldown block; and in response to the amount of the two or more hot blocks being less than the amount of the threshold value, suspending one or more types of actions for managing operation of the cache storage tier until the amount of the threshold value is exceeded, wherein the one or more types of actions include cooldown, coalescing, demotion, promotion, or re-balancing;

in response to one or more blocks in the cache storage tier being read, setting the heat score associated with the one or more blocks being read to the maximum heat score value; and in response to a request to evict an amount of the portion of the plurality of blocks stored in the cache storage tier, iteratively qualifying for eviction one or more of the amount of blocks until the entire amount is qualified and is then evicted based on the request, the clean status associated with each of the one or more blocks, the heat score associated with each of the one or more blocks, and a contiguous run-length for two or more blocks stored in the cache storage tier that have a same heat score that is less-than or equal to an evicted heat score, wherein each evicted block is associated with the clean status and the evicted heat score that is less-than or equal to the non-evicted heat score of each block of the portion of the plurality of blocks that remain stored in the cache storage tier; and a client computer, comprising:

a memory that stores at least instructions; and one or more processors that execute instructions that perform actions, including, reading the one or more blocks in the cache storage tier.

17. The system of claim 16, wherein the one or more network computer processors execute instructions that perform actions, further comprising:

determining one or more other blocks that are eligible for storing in the cache storage tier based on one or more cache policies and file system activity that is associated with the one or more other blocks; and storing the one or more other blocks in the cache storage tier, wherein each heat score associated with the one or more other blocks is set to the maximum heat score value.

18. The system of claim 16, wherein the one or more network computer processors execute instructions that perform actions, further comprising:

in response to writing to the one or more blocks in the cache storage tier, setting the heat score associated with the one or more blocks to the maximum heat score value.

19. The system of claim 16, wherein the one or more network computer processors execute instructions that perform actions, further comprising:
in response to the file system restarting after being shutdown while the portion of the plurality of blocks is in the cache storage tier, performing further actions, including:
determining each block in the cache storage tier based on the file system and the cache storage; and
setting the heat score for each block in the cache storage tier to an initial heat score value.

20. The system of claim 16, wherein the one or more network computer processors execute instructions that perform actions, further comprising:
providing one or more heat extents that include a heat score and a run-length; and
associating one or more blocks of the portion of the plurality of blocks in the cache storage tier with each heat extent based on a location of each block in the cache storage tier and the heat score of each block, wherein each block associated with each heat extent is contiguous to each other in the cache storage tier and each block associated with each heat extent has the same heat score, and wherein the run-length associated with each heat extent is set to a number of the one or more blocks associated with it.

* * * * *